US 9,554,145 B2

(12) United States Patent
Sun et al.

(10) Patent No.: US 9,554,145 B2
(45) Date of Patent: Jan. 24, 2017

(54) RE-ENCODING IMAGE SETS USING FREQUENCY-DOMAIN DIFFERENCES

(71) Applicant: Microsoft Corporation, Redmond, WA (US)

(72) Inventors: Xiaoyan Sun, Beijing (CN); Feng Wu, Beijing (CN); Hao Wu, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 58 days.

(21) Appl. No.: 14/518,994

(22) Filed: Oct. 20, 2014

(65) Prior Publication Data
US 2015/0341652 A1    Nov. 26, 2015

Related U.S. Application Data

(63) Continuation of application No. PCT/CN2014/078136, filed on May 22, 2014.

(51) Int. Cl.
*G06K 9/36* (2006.01)
*H04N 19/463* (2014.01)
(Continued)

(52) U.S. Cl.
CPC .......... *H04N 19/463* (2014.11); *H04N 19/124* (2014.11); *H04N 19/40* (2014.11);
(Continued)

(58) Field of Classification Search
CPC ...... H04N 19/124; H04N 19/40; H04N 19/44; H04N 19/463; H04N 19/48; H04N 19/50; H04N 19/91
(Continued)

(56) References Cited

U.S. PATENT DOCUMENTS 5,831,688 A * 11/1998 Yamada .................. H04N 19/40
                                                         348/699
6,222,887 B1 * 4/2001 Nishikawa ............ H04N 19/46
                                                         375/240.26
(Continued)

FOREIGN PATENT DOCUMENTS

| CN | 101507278 | 8/2009 |
| EP | 1045590 | 10/2000 |
| WO | WO 2015/006894 | 1/2015 |

OTHER PUBLICATIONS

Staffan Efucsson"Fixed and Adaptive Predictors for Hybrid Predictive/Transform Coding", IEEE Transactions on Communications, vol. COM-33, No. 12, Dec. 1985, pp. 1291-1302.*
(Continued)

*Primary Examiner* — Mekonen Bekele
(74) *Attorney, Agent, or Firm* — Cassandra T. Swain; Micky Minhas

(57) ABSTRACT

Approaches to re-encoding image sets using frequency-domain differences, along with corresponding approaches to reversing the re-encoding of the image sets. For example, a re-encoding tool computes frequency-domain differences between (a) quantized coefficients for a block from encoded data in a first format and (b) quantized coefficients for a prediction of the block. The re-encoding tool entropy codes the frequency-domain differences, producing encoded data in a second format for the compressed images. Such re-encoding can significantly reduce storage cost for previously compressed images, compared to the storage cost for the previously compressed images in the first format, without hurting image quality. Subsequently, the previously compressed images in the first format can be recovered from the encoded data in the second format. Or, the encoded data in the second format can be decoded to reconstruct the images.

20 Claims, 8 Drawing Sheets

(51) Int. Cl.
*H04N 19/124* (2014.01)
*H04N 19/44* (2014.01)
*H04N 19/50* (2014.01)
*H04N 19/91* (2014.01)
*H04N 19/48* (2014.01)
*H04N 19/40* (2014.01)

(52) U.S. Cl.
CPC ............ *H04N 19/44* (2014.11); *H04N 19/48* (2014.11); *H04N 19/50* (2014.11); *H04N 19/91* (2014.11)

(58) Field of Classification Search
USPC .......... 375/240.03, 240.12, 240.26; 382/233, 382/232, 250
See application file for complete search history.

(56) References Cited

U.S. PATENT DOCUMENTS

| | | | | |
|---|---|---|---|---|
| 6,246,438 | B1* | 6/2001 | Nishikawa | H04N 19/46 375/240.01 |
| 6,442,207 | B1* | 8/2002 | Nishikawa | H04N 19/46 375/240.12 |
| 8,774,264 | B2* | 7/2014 | Nakajima | H04N 19/159 375/240 |
| 8,811,495 | B1* | 8/2014 | Wen | H04N 19/176 375/240.16 |
| 2001/0006562 | A1 | 7/2001 | Tajime | |
| 2003/0133510 | A1* | 7/2003 | Nishikawa | H04N 19/46 375/240.26 |
| 2004/0190611 | A1* | 9/2004 | Nakajima | H04N 19/159 375/240.03 |
| 2006/0045188 | A1* | 3/2006 | Fuchie | G11B 27/031 375/240.26 |
| 2008/0043832 | A1 | 2/2008 | Moore et al. | |
| 2012/0114039 | A1 | 5/2012 | Wang | |
| 2012/0201462 | A1 | 8/2012 | Chang et al. | |

OTHER PUBLICATIONS

Ait-Aoudia et al., "A Comparison of Set Redundancy Compression Techniques," *EURASIP Journal on Applied Signal Processing*, vol. 2006, 13 pp. (Jan. 2006).
Au et al., "Digital Photo Album Compression Based on Global Motion Compensation and Intra/Inter Prediction," *Proc. Int'l Conf. on Audio, Language and Image Processing*, pp. 84-90 (Jul. 2012).
Chen et al., "Image Set Compression Through Minimal-Cost Prediction Structures," *Int'l Conf. on Image Processing*, vol. 2, pp. 1289-1292 (Oct. 2004).
Chu et al., "On the Shortest Arborescence of a Directed Graph," 1 p. (downloaded from the World Wide Web on Mar. 18, 2014) (original published as part of Chu et al., On the Shortest Arborescence of a Directed Graph, *Proc. of Science Sinica*, vol. 14, pp. 1396-1400 (1965)).
El-Sonbaty et al., "Compressing Sets of Similar Medical Images Using Multilevel Centroid Technique," *Proc. 7th Digital Image Computing: Techniques and Applications*, pp. 791-800 (Dec. 2003).
Fischler et al., "Random Sample Consensus: A Paradigm for Model Fitting with Applications to Image Analysis and Automated Cartography," *Communications of the ACM*, vol. 24, Issue 6, pp. 381-395 (Jun. 1981).
Karadimitriou et al., "Min-Max Compression Methods for Medical Image Databases," *Proc. of the ACM SIGMOD Record*, vol. 26, Issue 1, 6 pp. (Mar. 1997).
Karadimitriou, "Set Redundancy, the Enhanced Compression Model, and Methods for Compressing Sets of Similar Images," Louisiana State University, Ph.D. Thesis, 95 pp. (Aug. 1996).
Karadimitriou et al., "The Centroid Method for Compressing Sets of Similar Images," *Journal of Pattern Recognition Letters*, vol. 19, Issue 7, pp. 585-593 (May 1998).
Li et al., "Similar Images Compression based on DCT Pyramid Multi-level Low Frequency Template," *IEEE Int'l Workshop on Multimedia Signal Processing*, pp. 255-259 (Sep. 2012).
Liu et al., "Image Compression with Edge-Based Inpainting," *IEEE Trans. on Circuits and Systems for Video Technology*, vol. 17, No. 10, pp. 1273-1287 (Oct. 2007).
Lowe, "Distinctive Image Features from Scale-Invariant Keypoints," *Int'l Journal of Computer Vision*, vol. 60, Issue 2, 28 pp. (Jan. 2004).
Lu et al., "Digital Photo Similarity Analysis in Frequency Domain and Photo Album Compression," *Proc. of the $3^{rd}$ Int'l Conf. on Mobile and Ubiquitous Multimedia*, pp. 237-244 (Oct. 2004).
Musatenko et al., "Correlated Image Set Compression System Based on New Fast Efficient Algorithm of Karhunen-Loeve Transform," *Proc. of the Int'l Society for Optical Engineering: Multimedia Storage and Archiving Systems III*, 12 pp. (Oct. 1998).
Saha, "Image Compression—from DCT to Wavelets: A Review," *Crossroads, The ACM Student Magazine*, vol. 6, Issue 3, 22 pp. (Mar. 2000).
Schmieder et al., "A Study of Clustering Algorithms and Validity for Lossy Image Set Compression," *Proc. of Int'l Conf. on Image Processing, Computer Vision, & Pattern Recognition*, 6 pp. (Jul. 2009).
Shi et al., "Feature-Based Image Set Compression," *Proc. of IEEE Int'l Conf. on Multimedia and Expo*, 6 pp. (Jul. 2013).
Shi et al., "Multi-Model Prediction for Image Set Compression," *Proc. of Visual Communications and Image Processing (VCIP) Conf.*, 6 pp. (Nov. 2013).
Shi et al., "Photo Album Compression for Cloud Storage Using Local Features," *IEEE Journal on Emerging and Selected Topics in Circuits and Systems*, vol. 4, No. 1, pp. 17-28 (Mar. 2014).
Sun et al., "Compression with Vision Technologies," *Proc. of the Picture Coding Symp.*, 5 pp. (Apr. 2006).
Trocan et al., "Compressed Sensing of Multiview Images Using Disparity Compensation," *IEEE Int'l Conf. on Image Processing*, pp. 3345-3348 (Sep. 2010).
Van Assche et al., "Exploiting Interframe Redundancies in the Lossless Compression of 3D Medical Images," *Proc. of Data Compression Conf.*, pp. 521-527 (Mar. 2000).
Wallace, "The JPEG Still Picture Compression Standard," *Communications of the ACM*, vol. 34, Issue 4, 17 pp (Apr. 1991).
Wiegand et al., "WD2: Working Draft 2 of High-Efficiency Video Coding," JCTVC-D503, 155 pp. (Jan. 2011).
Yang et al., "An Overview of Lossless Digital Image Compression Techniques," *Proc. of $48^{th}$ Midwest Symp. On Circuits and Systems*, pp. 1099-1102 (Aug. 2005).
Yeung et al., "Compressing Similar Image Sets Using Low Frequency Template," *Proc. of IEEE Int'l Conf. on Multimedia and Expo*, 6 pp. (Jul. 2011).
Yue et al., "SIFT-Based Image Compression," *IEEE Int'l Conf. on Multimedia and Expo*, pp. 473-478 (Jul. 2012).
Zou et al., "Personal Photo Album Compression and Management," *Proc. Int'l Symp. On Circuits and Systems*, pp. 1428-1431 (May 2013).
International Search Report and Written Opinion dated Feb. 27, 2015, from International Patent Application No. PCT/CN2014/078136, 11 pp.

\* cited by examiner software 180 implementing one or more innovations for re-encoding image sets using frequency-domain differences and/or for corresponding operations to reverse such re-encoding

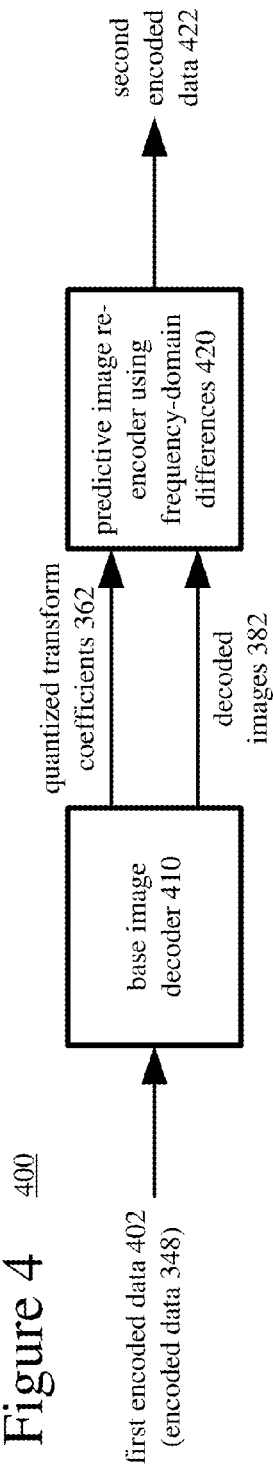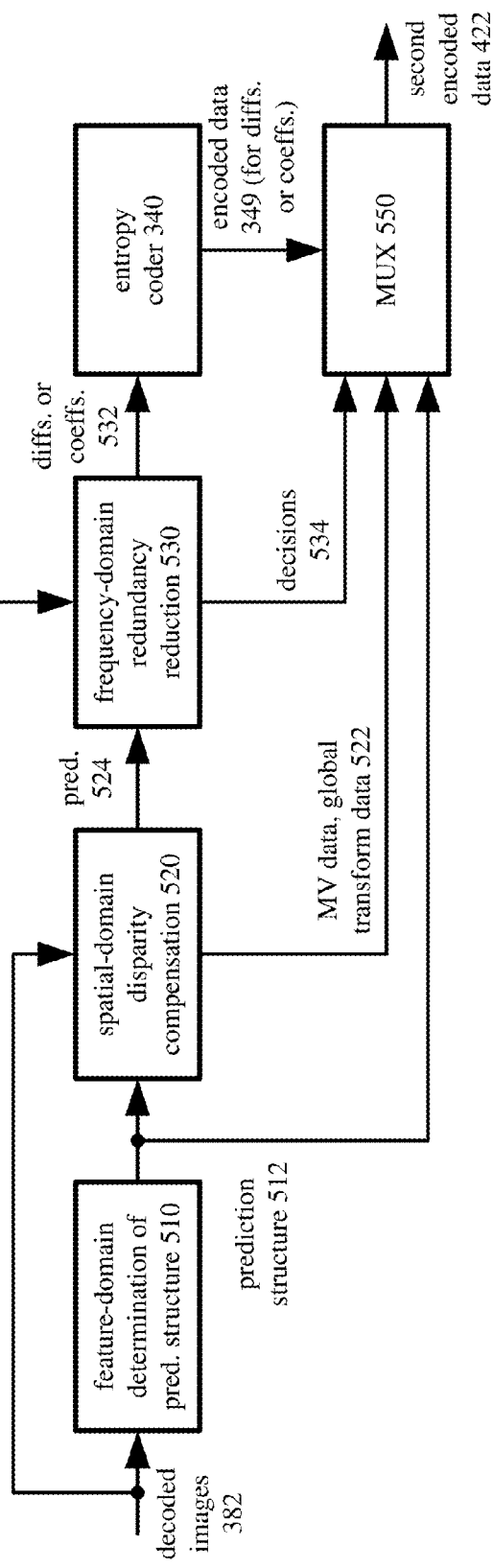
Figure 4
Figure 5

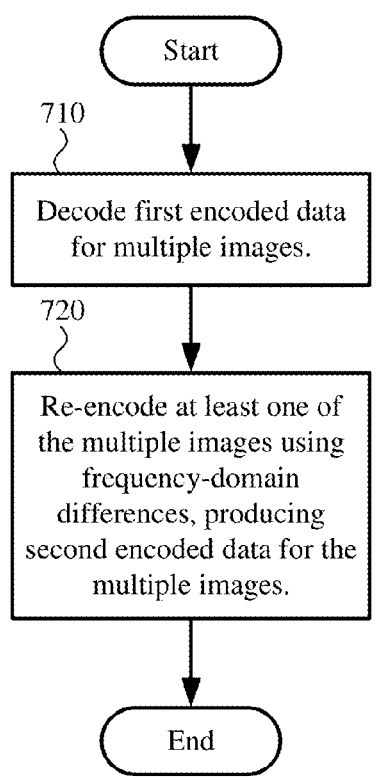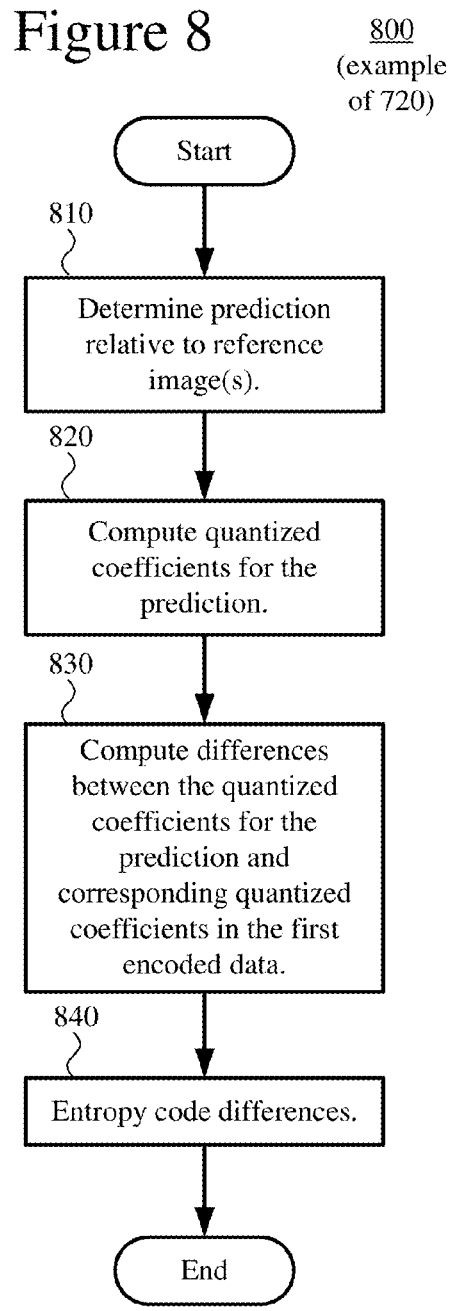

Figure 12
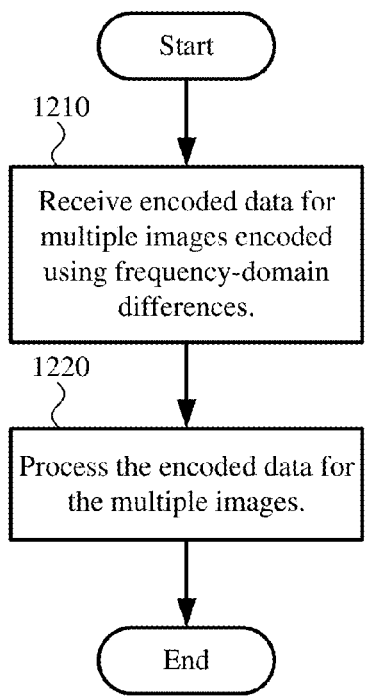
Figure 13 (example of 1220)
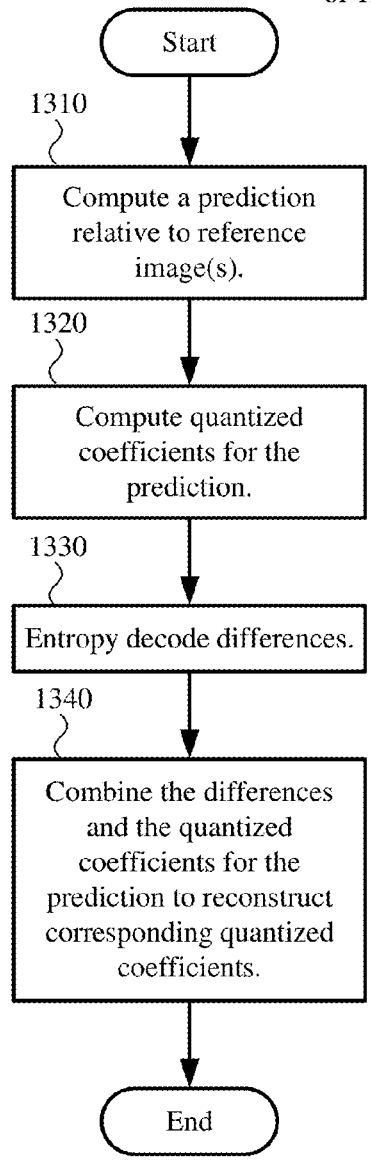

RE-ENCODING IMAGE SETS USING FREQUENCY-DOMAIN DIFFERENCES

CROSS REFERENCE TO RELATED APPLICATIONS

This application is a continuation of International Patent Application No. PCT/CN2014/078136, filed May 22, 2014, currently pending, the disclosure of which is hereby incorporated by reference.

BACKGROUND

With the increased usage of digital cameras (especially those included with smartphones or other devices), storage of digital photographs poses significant challenges for personal devices and for "cloud" storage services available through the Internet. In particular, digital cameras in smartphones and other mobile computing devices have dramatically increased the number of digital images that are captured, shared and stored, since such devices are carried by large numbers of users in their daily activities. At the same time, newer digital cameras use sensors that yield higher-resolution images. The higher-resolution images have more sample values per image and tend to have higher storage cost per image.

Engineers use compression (also called source coding, source encoding, or simply coding or encoding) to reduce the bit rate of digital images. Compression decreases the cost of storing and transmitting image information by converting the information into a lower bit rate form. Compression can be lossless or lossy. Lossless compression typically reduces bit rate and does not hurt image quality. On the other hand, in lossy compression, bit rate reduction tends to be more significant, at the cost of reduction in image quality. Decompression (also called decoding) reconstructs a version of the original information from the compressed form. A "codec" is an encoder/decoder system.

Since the early 1990s, various image codec standards have been adopted, including the JPEG standard (ITU-T T.81 or ISO/IEC 10918-1), JPEG 2000 standard (ISO/IEC 15444), and JPEG XR standard (ITU-T T.832 or ISO/IEC 29199-2). Digital images can also be processed using intra-picture encoding and decoding for a video codec standard, such as the H.264/AVC standard (ITU-T H.264, MPEG-4 AVC or ISO/IEC 14496-10) or H.265/HEVC standard (ITU-T H.265 or ISO/IEC 23008-2). A codec standard typically defines options for the syntax of an encoded data bitstream, detailing parameters in the bitstream when particular features are used in encoding and decoding. In many cases, a codec standard also provides details about the decoding operations a decoder should perform to achieve conforming results in decoding. Aside from codec standards, various proprietary codec formats (such as VP8 and VP9) define other options for the syntax of an encoded data bitstream and corresponding decoding operations.

Thus, image compression can reduce the storage cost for digital photographs, but most conventional image encoding approaches do not exploit correlations that exist between different images. For example, consider a series of digital photographs captured using burst mode capture or a set of digital photographs in a photograph album. The images in the series or album may be highly correlated, yet most image encoding approaches only consider each image by itself during compression.

Some existing "image set" compression approaches exploit inter-image redundancy between images to reduce bit rate. A few of these encoding approaches even enable lossless compression. Such approaches typically compress "raw" input digital images, as opposed to previously encoded digital images, in order to achieve significant reduction in storage cost. When existing lossy image set compression approaches are applied to reconstructed versions of previously encoded digital images, the approaches rarely reduce bit rate unless image quality also suffers. Applying existing lossless image set compression approaches to reconstructed versions of previously encoded digital images (attempting to reduce storage cost without further reducing image quality) usually increases bit rate instead of reducing it. Thus, in some scenarios, existing image set compression approaches fail to provide efficient performance when re-encoding previously encoded digital images.

SUMMARY

In summary, the detailed description presents approaches to re-encoding image sets using frequency-domain differences, along with corresponding approaches to reversing the re-encoding of the image sets. In some example implementations, the re-encoding approaches can significantly reduce the storage cost for a set of previously encoded digital images without hurting image quality. In other words, in these example implementations, the re-encoding approaches can provide lossless compression for previously encoded digital images.

According to a first aspect of the innovations described herein, a re-encoding tool decodes first encoded data for a set of multiple images in a first format. The re-encoding tool re-encodes at least one of the set of multiple images, producing second encoded data for the multiple images in a second format. As part of the re-encoding, the re-encoding tool determines frequency-domain differences.

For example, as part of the re-encoding, the re-encoding tool determines a prediction relative to one or more reference images. The re-encoding tool can determine the prediction for a given block of a given image of the multiple images using spatial-domain disparity compensation (e.g., motion compensation) relative to the one or more reference images. For the spatial-domain disparity compensation, the multiple images can be organized according to a prediction structure that depends on analysis of features of the multiple images. Also, as part of the spatial-domain disparity compensation, a reference image can be adjusted according to a deformation transformation (such as a global affine transformation) and/or a photometric transformation (such as a global brightness compensation).

The re-encoding tool also computes quantized coefficients for the prediction. For example, to compute the quantized coefficients for the prediction for a given block, the re-encoding tool performs a frequency transform on sample values of the prediction for the block to produce coefficients for the prediction, and quantizes the coefficients for the prediction using a quantization parameter ("QP") value. The second-format re-encoding can mirror the first-format decoding in several respects. For example, the decoding can include an inverse frequency transform that is the inverse of the frequency transform used during the re-encoding. Also, the decoding can include inverse quantization that uses the same QP value (e.g., the QP value used for the given block) as the re-encoding, which facilitates lossless compression for the re-encoding process.

Then, the re-encoding tool computes frequency-domain differences between the quantized coefficients for the prediction (e.g., for a given block) and corresponding quantized coefficients (e.g., for the block) that are represented in the first encoded data. Since they are computed using quantized coefficients, the differences are frequency-domain differences. The re-encoding tool entropy codes the frequency-domain differences.

During re-encoding, for a given block, the re-encoding tool can select between using frequency-domain differences and using the corresponding quantized coefficients (from the first encoded data), for inclusion in the second encoded data. For example, the selection depends at least in part on a cost metric for the frequency-domain differences and a cost metric for the corresponding quantized coefficients. In this way, the re-encoding tool can use spatial-domain disparity compensation when it improves compression performance, but otherwise use compression according to the first format.

The re-encoding tool can repeat this process on a block-by-block basis for multiple blocks of the given image of the multiple images.

According to another aspect of the innovations described herein, a computing system includes a base decoder and a predictive re-encoder. The base decoder is adapted to decode first encoded data (e.g., in a first format) for images. The predictive re-encoder is adapted to re-encode at least one of the images and thereby produce second encoded data (e.g., in a second format) for the images. The predictive re-encoder includes (a) a spatial-domain disparity compensation module adapted to determine a prediction relative to one or more reference images, (b) a frequency transformer adapted to produce transform coefficients for the prediction, (c) a quantizer adapted to quantize the transform coefficients for the prediction, (d) a differencing module adapted to compute frequency-domain differences between the quantized transform coefficients for the prediction and corresponding quantized transform coefficients represented in the first encoded data, and (e) an entropy coder adapted to entropy code the frequency-domain differences. The predictive re-encoder can also include (f) a selector module adapted to select, for inclusion in the second encoded data, the frequency-domain differences or the corresponding quantized transform coefficients.

According to a third aspect of the innovations described herein, a transcoding tool or decoding tool reverses the re-encoding of a set of images. The tool receives and processes encoded data for a set of multiple images. As part of the processing, the tool computes a prediction relative to one or more reference images (e.g., using spatial-domain disparity compensation) and computes quantized coefficients for the prediction. The tool also entropy decodes frequency-domain differences and combines the frequency-domain differences and the quantized coefficients for the prediction to reconstruct corresponding quantized coefficients. For decoding, the tool inverse quantizes the corresponding quantized coefficients, then performs an inverse frequency transform on the inverse quantized coefficients to reconstruct the images. On the other hand, for transcoding (e.g., into the first format), the tool entropy codes the corresponding quantized coefficients. The tool can repeat this process on a block-by-block basis for multiple blocks of a given image.

The innovations for re-encoding image sets using frequency-domain differences, and corresponding transcoding and decoding operations, can be implemented as part of a method, as part of a computing system adapted to perform the method or as part of a tangible computer-readable media storing computer-executable instructions for causing a computing system to perform the method. The various innovations can be used in combination or separately.

The foregoing and other objects, features, and advantages of the invention will become more apparent from the following detailed description, which proceeds with reference to the accompanying figures.

BRIEF DESCRIPTION OF THE DRAWINGS

FIG. 4 is a diagram of a generalized image re-encoding tool in conjunction with which some described embodiments can be implemented.

FIG. 5 is a diagram of an example predictive image re-encoder module in the image re-encoding tool of FIG. 4.

FIG. 7 is a flowchart of a generalized technique for re-encoding images using frequency-domain differences.

FIG. 8 is a flowchart of an example technique for re-encoding a block of an image of an image set using frequency-domain differences.

FIG. 12 is a flowchart of a generalized technique for transcoding (or decoding) images using frequency-domain differences.

FIG. 13 is a flowchart of an example technique for transcoding (or decoding) a block of an image of an image set using frequency-domain differences.

DETAILED DESCRIPTION

Figure 1:
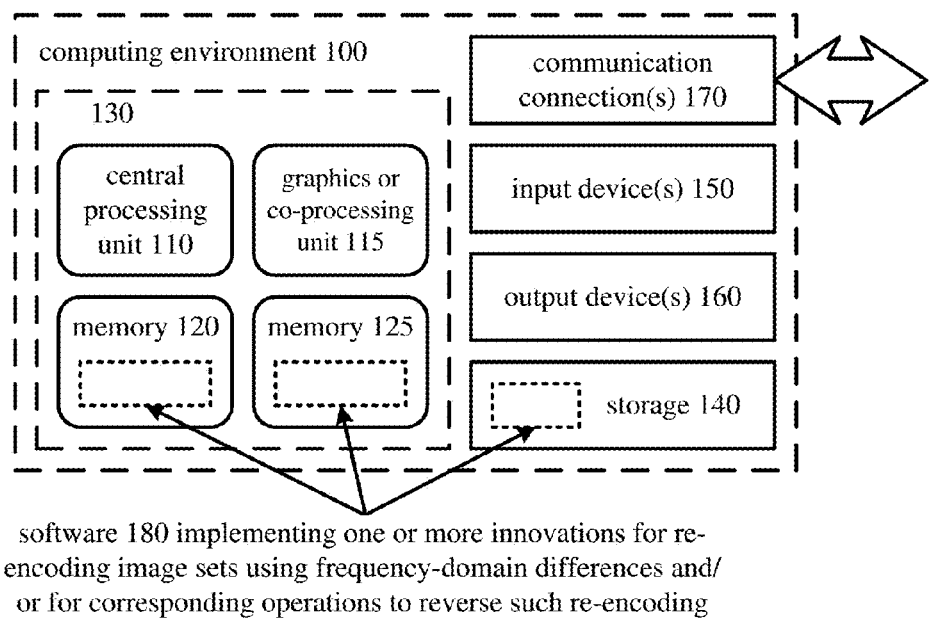
FIG. 1 is a diagram of an example computing system in which some described embodiments can be implemented

The detailed description presents innovations in the area of re-encoding sets of compressed images and reversing such re-encoding. For example, a re-encoding tool computes frequency-domain differences between (a) quantized coefficients for a block from encoded data in a first format and (b) quantized coefficients for a prediction of the block, then entropy codes the frequency-domain differences, producing encoded data in a second format for the compressed images. In some example implementations, the re-encoding can significantly reduce storage cost for previously compressed images without hurting image quality. In many cases, the re-encoding provides lossless compression that reduces bit rate by 5%, 10% or more, compared to the storage cost for the previously compressed images in the first format.

Subsequently, the previously compressed images in the first format can be recovered from the encoded data in the second format. Or, the encoded data in the second format can be decoded to reconstruct the images.

Although operations described herein are in places described as being performed by an image encoder, image transcoder or image decoder, in many cases the operations can be performed by another type of media processing tool (e.g., video encoder, video transcoder or video decoder). The operations can be performed for applications such as still-image coding or decoding, medical scan content coding or decoding, multispectral imagery content coding or decoding, etc.

Some of the innovations described herein are illustrated with reference to syntax elements and operations specific to the JPEG standard. The innovations described herein can also be implemented for other standards or formats, such as the JPEG XR standard, JPEG 2000 standard, intra-coding/decoding for the H.264/AVC standard, intra-coding/decoding for the H.265/HEVC standard, intra-coding/decoding for the VP8 format, intra-coding/decoding for the VP9 format, and the WebP format.

As used herein, the term "block" generally indicates an arrangement of values for purposes of a frequency transform (or inverse frequency transform) and quantization (or inverse quantization). That is, a "block" is a transform block. An arrangement of values for purposes of motion compensation or other spatial-domain disparity compensation is termed a motion partition or partition, although the term "block" can also be used to indicate a partition. For a given block (transform block), a prediction for the block can be determined using a partition of the same size (partition size=transform block size). Or, the prediction for the block can be determined using a larger partition, in which case the partition provides predicted sample values for predictions for multiple blocks (transform blocks). Or, the prediction for the block can be determined using multiple smaller partitions.

In the examples described herein, identical reference numbers in different figures indicate an identical component or module. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

FIG. 1 illustrates a generalized example of an example computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for re-encoding image sets using frequency-domain differences and/or for corresponding operations to reverse such re-encoding, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for re-encoding image sets using frequency-domain differences and/or for corresponding operations to reverse such re-encoding.

The input device(s) (150) may be a touch input device such as a keyboard, mouse, pen, or trackball, a voice input device, a scanning device, or another device that provides input to the computing system (100). For images, the input device(s) (150) may be a camera, video card, TV tuner card, screen capture module, scanning device, or similar device that accepts image input in analog or digital form, or a CD-ROM or CD-RW that reads image input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, image input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Cloud Computing Environments.

Figure 2:
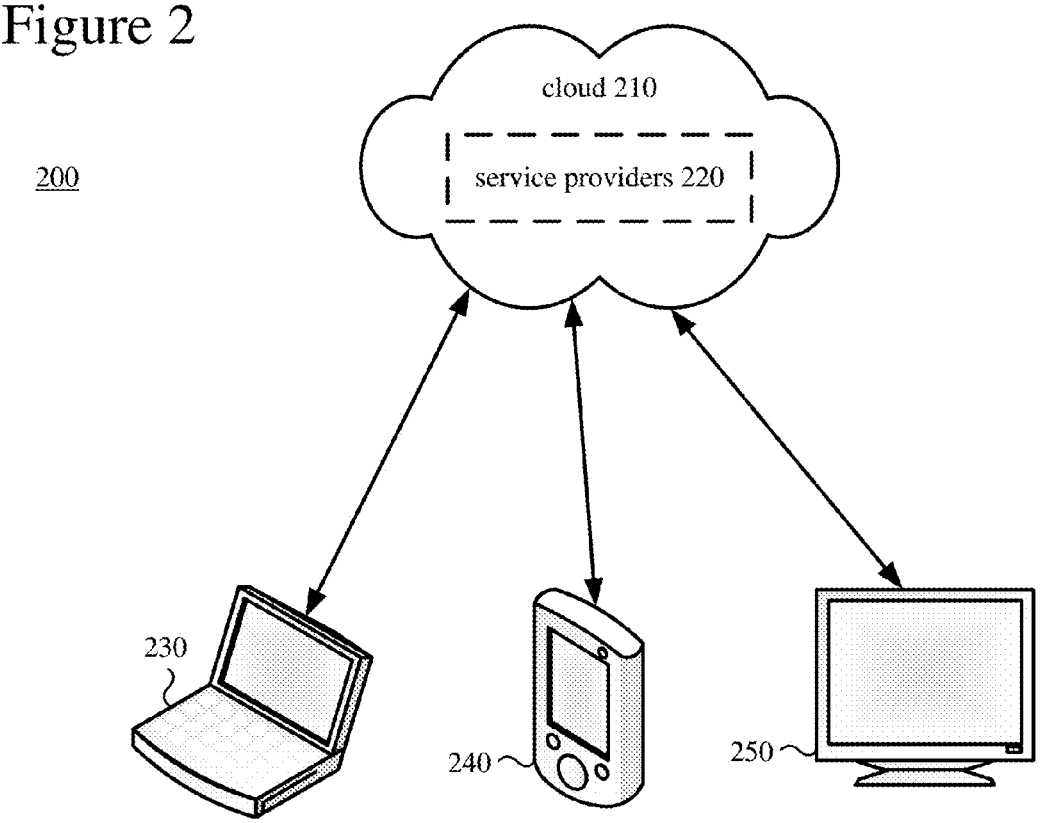
FIG. 2 is a diagram of an example cloud computing environment in which some described embodiments can be implemented

FIG. 2 illustrates a generalized example of an example cloud computing environment (200) in which several of the described innovations may be implemented. In the example environment (200), various types of services (e.g., computing services) are provided by a cloud (210). For example, the cloud (210) can comprise a collection of computing devices, which may be located centrally or distributed, that provide cloud-based services for image storage to various types of users and devices connected via a network such as the Internet. The computing devices of the cloud computing environment (200) can be used in different ways to accomplish computing tasks. For example, some tasks (e.g., processing user input and presenting a user interface) can be performed on local computing devices (e.g., connected devices 230, 240, 250), while other tasks (e.g., image storage, image re-encoding, image transcoding) can be performed in the cloud (210).

In the example cloud computing environment (200), the cloud (210) provides services for connected devices (230, 240, 250) with a variety of screen capabilities. A first connected device (230) represents a device with a computer screen (e.g., a mid-size screen). For example, the first connected device (230) could be a personal computer such as desktop computer, laptop computer, notebook computer, netbook computer, or the like. A second connected device (240) represents a device with a mobile device screen (e.g., a small size screen). For example, the second connected device (240) could be a mobile phone, smartphone, personal digital assistant, tablet computer, and the like. A third connected device (250) represents a device associated with a large screen. For example, the third connected device (250) could be a television screen (e.g., a smart television) or another device connected to a television (e.g., a set-top box or gaming console) or the like. Devices without screen capabilities also can be used in the example cloud computing environment (200). For example, the cloud (210) can provide services for one or more computers (e.g., server computers) without displays.

Services can be provided by the cloud (210) through service providers (220) or through other providers of online services (not depicted). Cloud services can be customized to the screen size, display capability, and/or touchscreen capability of a particular connected device (e.g., connected devices 230, 240, and/or 250).

In the example cloud computing environment (200), the cloud (210) can provide image storage services, image re-encoding services, image transcoding services and/or other image processing services described herein to the various connected devices (230, 240, and/or 250) using, at least in part, the service providers (220). In this case, the service providers (220) can provide a centralized solution for various cloud-based services. The service providers (220) can manage service subscriptions for users and/or devices (e.g., for the connected devices (230, 240, 250) and/or their respective users). For example, a connected device (230, 240 or 250) provides compressed images in a first format (e.g., JPEG) to the cloud (210). A computing system in the cloud (210) re-encodes the compressed images using frequency-domain differences, and stores the resulting encoded data in a second format. When the connected device (230, 240 or 250) requests one or more of the compressed images, a computing system in the cloud (210) transcodes the compressed images from the second format back to the first format, then provides the requested compressed image(s) in the first format back to the connected device (230, 240 or 250).

Alternatively, one of the connected devices (230, 240 or 250) in the cloud computing environment (200) performs the re-encoding, the storage of compressed data in the second format, the transcoding, and/or decoding from the second format (e.g., for processing of images in a burst-mode capture series).

III. Example Base Image Encoder and Base Image Decoder.

Figure 3:
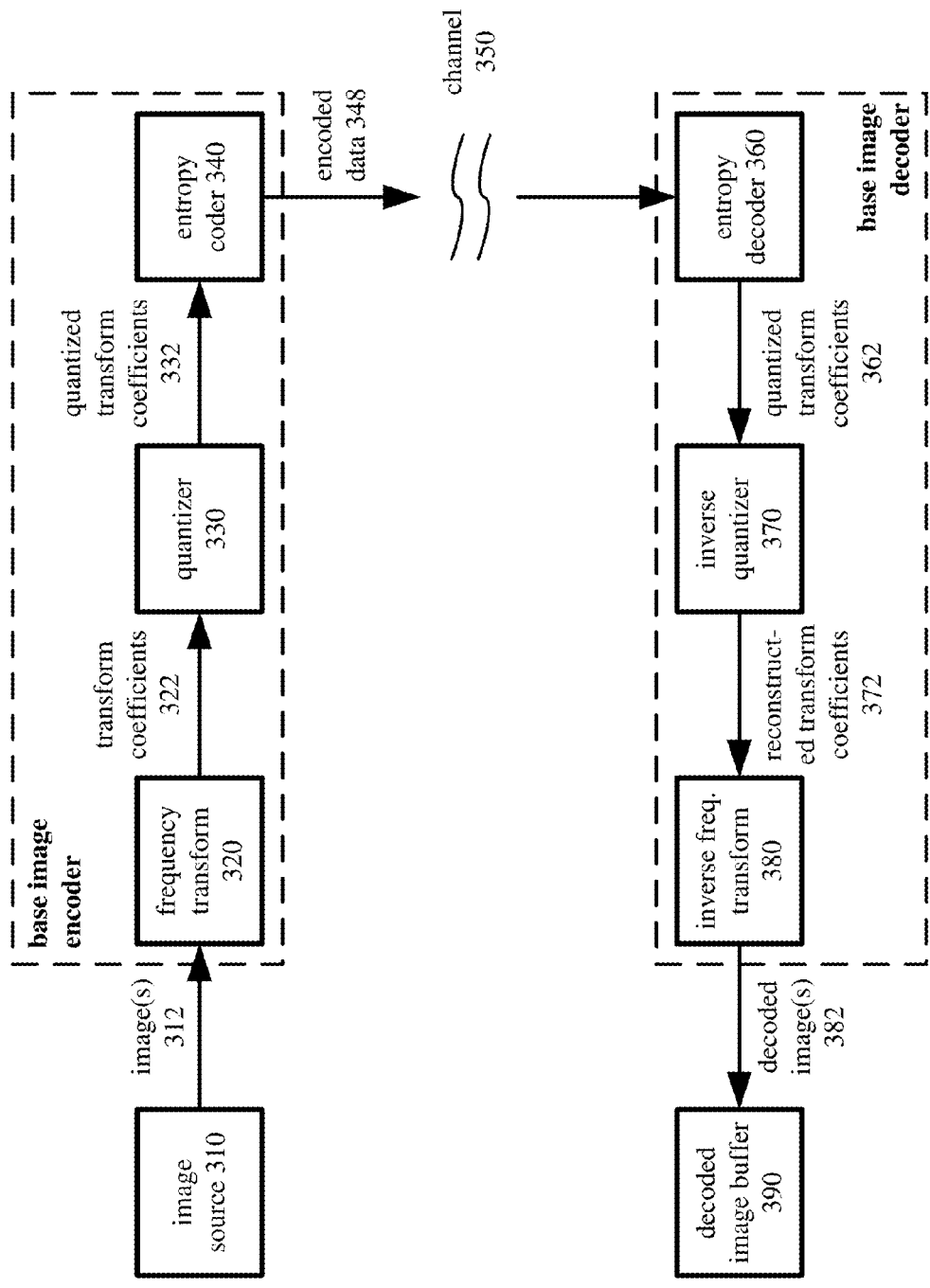
FIG. 3 is a diagram of a base image encoder and base image decoder.

FIG. 3 shows a codec system (300) that includes a base image encoder and corresponding base image decoder. The base image encoder and base image decoder are block-based and use a block format that depends on implementation. Blocks (transform blocks) may be further sub-divided at different stages, e.g., frequency transform and/or entropy encoding stages. For example, an image can be divided into 64×64 blocks, 32×32 blocks, 16×16 or 8×8 blocks, which can in turn be divided into smaller blocks of sample values for some stages of coding and decoding.

Overall, the base image encoder receives one or more images (312) from an image source (310) and produces encoded data (348) in a bitstream as output to a channel (350). The image source (310) can be a camera, tuner card, storage media, screen capture module, or other digital image source. The image source (310) produces a single image or a series of images (e.g., from burst mode capture).

A. Base Image Encoder and Channel.

The base image encoder compresses images using intra-picture coding. The frequency transformer (320) converts spatial-domain image information for the image(s) (312) into frequency-domain (i.e., spectral, transform) data. For block-based image coding, the frequency transformer applies a discrete cosine transform ("DCT"), an integer approximation thereof, or another type of forward block transform (e.g., a discrete sine transform or an integer approximation thereof) to a block of sample values for one of the image(s) (312), producing a block of transform coefficients (322).

The quantizer (330) quantizes the transform coefficients (322). The quantization can include scaling according to scale factors as well as uniform quantization. For example, the quantizer applies dead-zone scalar quantization to the transform coefficients (322) with a quantization step size that varies on an image-by-image basis, slice-by-slice basis, block-by-block basis, frequency-specific basis or other basis. The quantized transform coefficients (332) are provided to the entropy coder (340).

The entropy coder (340) entropy codes the quantized transform coefficients (332) as well as certain side information (e.g., quantization parameter ("QP") values, mode decisions, parameter choices), producing encoded data (348). Typical entropy coding techniques include Exponential-Golomb coding, Golomb-Rice coding, arithmetic coding, differential coding, Huffman coding and other variable-length coding, run length coding, variable-length-to-variable-length coding, variable-length-to-fixed-length coding, Lempel-Ziv coding, and dictionary coding, and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique. The entropy coder (340) or another module can also format and/or entropy code general control data, which can include signals indicating color spaces, color sampling rates and/or bit depths for images, slice, blocks, or other units of the image. The entropy coder (340) provides the encoded data (348) in a bitstream. The format of the bitstream can be JPEG, JPEG XR, JPEG 2000, H.264/AVC (intra), H.265/HEVC (intra), or VPx (intra), or a variation or extension thereof, or some other format.

A general encoding control (not shown) receives the images (312) from the image source (310) as well as feedback (not shown) from various modules of the base image encoder. Overall, the general encoding control provides control signals (not shown) to other modules (such as the frequency transformer (320) and quantizer (330)) to set and change coding parameters during encoding. In particular, the general encoding control can set QP values during encoding on an image-by-image basis, slice-by-slice basis, block-by-block basis or some other unit-by-unit basis. The general encoding control produces general control data (not shown) that indicates decisions made during encoding, so that a corresponding decoder can make consistent decisions. The general control data can be provided to the entropy coder (340).

In alternative embodiments, a base image encoder includes different modules and/or other configurations of modules. For example, the base image encoder can include modules for intra-picture prediction (e.g., spatial prediction), such as an intra-picture estimator and predictor, as well as modules for reconstruction of image content used for the spatial prediction. The intra-picture estimator determines how to spatially predict sample values of a prediction for a block of an image from neighboring, previously reconstructed sample values of the image. The intra-picture estimator produces as side information such as prediction mode direction (for intra spatial prediction). The side information is provided to the entropy coder (340) as well as the intra-picture predictor, which spatially predicts sample values of the prediction for the block from neighboring, previously reconstructed sample values of the image. Differences, or residual values, between sample values for a block and sample values for its prediction are transformed using the frequency transformer (320), quantized using the quantizer (330) and entropy coded using the entropy coder (340). An inverse quantizer and inverse transformer (not shown) within the base image encoder reconstruct the residual values, which are combined with the sample values of the prediction for use in subsequent spatial prediction within the image.

The encoded data (348) in the bitstream is buffered. The encoded data (348) can be processed by a channel encoder (not shown), which can packetize and/or multiplex the encoded data (348) for transmission or storage as a media stream, or for storage as a file. Or, more generally, the channel encoder can implement one or more media system multiplexing protocols or transport protocols. The channel encoder provides output to the channel (350), which represents storage, a communications connection, or another channel for the output. The channel encoder or channel (350) may also include other elements (not shown), e.g., for forward-error correction ("FEC") encoding and analog signal modulation.

B. Base Image Decoder.

The channel (350) provides the encoded data (348) to the base image decoder. The encoded data (348) may have been channel coded, in which case a channel decoder can process the encoded data (348). For example, the channel decoder de-packetizes and/or demultiplexes data that has been aggregated for transmission or storage as a media stream, or for storage as a file. Or, more generally, the channel decoder can implement one or more media system demultiplexing protocols or transport protocols. The channel decoder may also include other elements (not shown), e.g., for FEC decoding and analog signal demodulation. The encoded data (348) that is output from the channel decoder is buffered until a sufficient quantity of such data has been received.

Overall, the base image decoder receives the encoded data (348) in a bitstream and reconstructs one or more images (382). Using intra-picture decoding, the base image decoder decompresses the image(s) (382), which are buffered in the decoded picture buffer (390).

The entropy decoder (360) or another module can parse and/or entropy decode general control data, which can include signals indicating color spaces, color sampling rates and/or bit depths for images, slice, blocks, or other units of the image. The entropy decoder (360) entropy decodes entropy-coded data, typically applying the inverse of entropy coding performed in the base image encoder. Typical entropy decoding techniques include Exponential-Golomb decoding, Golomb-Rice decoding, arithmetic decoding, differential decoding, Huffman decoding and other variable-length decoding, run length decoding, variable-length-to-variable-length decoding, variable-length-to-fixed-length decoding, Lempel-Ziv decoding, and dictionary decoding, and combinations of the above. As a result of the parsing and entropy decoding, the entropy decoder (360) produces quantized transform coefficient data (362) as well as side information (e.g., QP values, mode decisions, parameter choices).

The inverse quantizer (370) inverse quantizes the quantized transform coefficients (362), producing reconstructed transform coefficients (372). The inverse quantization can include scaling according to scale factors as well as uniform (inverse) quantization.

The inverse frequency transformer (380) performs an inverse frequency transform. For block-based decoding, the inverse frequency transformer (380) converts a block of reconstructed transform coefficients (372) to a block of reconstructed sample values for a decoded image (382). The inverse frequency transform can be an inverse DCT, an integer approximation thereof, or another type of inverse frequency transform (e.g., an inverse discrete sine transform or an integer approximation thereof).

A general decoding control (not shown) receives general control data (not shown) and provides control signals (not shown) to other modules (such as the inverse frequency transformer (380) and inverse quantizer (370)) to set and change decoding parameters during decoding. In particular, the general decoding control can cause the base image decoder to switch QP values during decoding on an image-by-image basis, slice-by-slice basis, block-by-block basis or some other unit-by-unit basis.

In alternative embodiments, a base image decoder includes different modules and/or other configurations of modules. For example, the base image decoder can include modules for intra-picture prediction (e.g., spatial prediction), such as an intra-picture predictor. Based on side information such as prediction mode directions from the entropy decoder (360), the intra-picture predictor spatially predicts sample values of a prediction for a block of an image from neighboring, previously reconstructed sample values of the image. Differences between sample values for the block and sample values for the prediction are reconstructed using an inverse quantizer and inverse frequency transformer, then combined with the sample values of the prediction.

IV. Example Image Re-Encoding Tools and Techniques.

An image re-encoding tool decodes previously compressed images in a first format then re-encodes the images. The re-encoding tool computes frequency-domain differences between (a) quantized coefficients from encoded data in the first format and (b) quantized coefficients for a prediction. The re-encoding tool then entropy codes the differences, producing encoded data in a second format for the compressed images. In many cases, the re-encoding provides lossless compression that reduces bit rate by 5%, 10% or more, compared to the storage cost for the previously compressed images in the first format.

A. Generalized Image Re-Encoding Tools.

FIG. 4 is a diagram of a generalized image re-encoding tool (400) in conjunction with which some described embodiments can be implemented. The image re-encoding tool (400) includes a base image decoder (410) and a predictive image re-encoder (420). The base image decoder (410) receives first encoded data (402), which corresponds to the encoded data (348) produced by a base image encoder (300) as shown in FIG. 3. The first encoded data (402) includes encoded data for a set of compressed images, e.g., for a photograph album or burst-mode capture series. The format of the first encoded data (402) can be JPEG, JPEG XR, JPEG 2000, H.264/AVC (intra), H.265/HEVC (intra), or VPx (intra), or a variation or extension thereof, or some other format.

The base image decoder (410) can be organized as described with reference to the base image decoder of FIG. 3, or the base image decoder (410) can have some other organization. In any case, the base image decoder (410) decodes the first encoded data (402) to produce decoded images (382). The base image decoder (410) also outputs quantized transform coefficients (362), which are used by the predictive image re-encoder (420).

The predictive image re-encoder (420) re-encodes the decoded images (382) to produce second encoded data (422). As part of the re-encoding, for at least some blocks of the decoded images (382), the predictive image re-encoder (420) computes frequency-domain differences between the quantized transform coefficients (362) (from the base image decoder (410)) and quantized transform coefficients for a prediction. The predictive image re-encoder (420) entropy codes the differences, which are included in the second encoded data (422). The predictive image re-encoder (420) can be organized as described with reference to FIG. 5, or the predictive image re-encoder (420) can have some other organization (e.g., lacking feature-domain determination of a prediction structure and/or lacking spatial-domain disparity compensation).

FIG. 5 is a diagram of an example predictive image re-encoder (500), which re-encodes previously compressed images of an image set. The predictive image re-encoder (500) compresses the images of the image set using a combination of feature-domain, spatial-domain and frequency-domain compression techniques to remove inter-image redundancy. Overall, the predictive image re-encoder (500) models correlation among the set of decoded images (382), determines spatial-domain predictions for at least some blocks of the decoded images (382), computes frequency-domain differences between the predictions and corresponding blocks of the decoded images (382), and losslessly compresses the frequency-domain differences. The second encoded data (422) includes the losslessly compressed differences as well as side information produced by modules of the predictive image re-encoder (500).

A decoded picture buffer buffers the set of decoded images (382) for use as reference images. A first module (510) of the predictive image re-encoder (500) performs feature-domain determination of a prediction structure (512) for the set of decoded images (382). The feature-domain determination module (510) measures similarity of features between images within the set of decoded images (382) (e.g., between pairs of images). Based on the feature-level similarity, the feature-domain determination module (510) determines the prediction structure (512). Conceptually, the prediction structure (512) organizes the set of decoded images (382) as a pseudo video sequence by ordering the images (382).

Unlike a natural video sequence, which inherently has temporal correlations from image to image, a set of compressed images for a photograph album may be disordered and have only loose correlations. Inter-image disparities due to motion can be complicated by variations in rotation, zooming, illumination, etc. as the images were captured. (In contrast, a burst-mode capture series tend to have stronger correlations from image to image, with less variation in rotation, zooming, illumination, etc.)

In some example implementations, the feature-domain determination module (510) measures the similarity between pairs of images according to distance between scale-invariant feature transform ("SIFT") descriptors, which helps avoid the impact of large motion offsets and luminance changes. In general, a SIFT descriptor describes the distinctive, invariant features of a local image region, including key-point location, scale, orientation, and feature vector. The key-point location and scale can be determined by finding the maxima and minima of differences of Gaussian signals. The feature vector is, for example, a 128-dimension vector which characterizes the local image region by the histogram of gradient directions. The orientation can denote the dominant direction of the gradient histogram. SIFT descriptors typically have a high level of distinctiveness. For additional details about computation and use of SIFT descriptors in this context, see Shi et al., "Feature-based Image Set Compression," IEEE Conference on Multimedia and Expo, pp. 1-6 (2013) or Shi et al., "Photo Album Compression for Cloud Storage Using Local Features," IEEE Journal on Emerging and Selected Topics in Circuits and Systems, Vol. 4, No. 1 (March 2014).

In the example implementations, the feature-domain determination module (510) approximates the predictive cost between images by the distance between their SIFT descriptors. $I_{set}=\{I_1, I_2, \ldots, I_N\}$ denotes an image set which contains N correlated images. Taking two images $I_n$ and $I_m$ as an example, the predictive cost $p_{n,m}$ for using $I_n$ to predict $I_m$ is determined by the average distance of the set of matched SIFT descriptors $s_{n,m}$ between the two images.

$$p_{n,m} = \frac{1}{|s_{n,m}|} \sum_{\forall (s_n^r, s_m^r) \in s_{n,m}} D(s_n^r, s_m^r),$$

where $s_n^r$ and $s_m^r$ are SIFT descriptors derived from $I_n$ and $I_m$, respectively, $(s_n^r, s_m^r)$ denotes the $r^{th}$ pair of matched SIFT descriptors in the set $s_{n,m}$, and $|A|$ is the number of elements in a set A. The distance $D(s_n^r, s_m^r)$ between two descriptors is calculated as:

$$D(s_n^r, s_m^r) = \frac{1}{|v_m^r|} \|v_n^r - v_m^r\|^2,$$

where $v_n^r$ and $v_m^r$ denote the 128-dimension feature vectors of $s_n^r$ and $s_m^r$, respectively.

In the example implementations, the feature-domain determination module (510) estimates the predictive cost between each pair of images among the set of decoded images (382) (using the approach describe above), then generates a directed graph that incorporates the pair-wise predictive costs. The feature-domain determination module (510) determines a minimum spanning tree ("MST") from the directed graph by minimizing the total predictive cost, then determines the prediction structure (512) for the set of images $I_{set}$ according to a depth-first traversal of the MST. For additional details about the determination of the directed graph, MST and prediction structure in example implementations, see Shi et al., "Photo Album Compression for Cloud Storage Using Local Features," which is referenced above.

Alternatively, the feature-domain determination module (510) determines the prediction structure (512) for the set of decoded images (382) in some other way (e.g., using descriptors other than SIFT descriptors, using a structural similarity ("SSIM") index or other measure of structural similarity, using pixel signatures, and so on).

A second module (520) of the predictive image re-encoder (500) performs spatial-domain disparity compensation. The spatial-domain disparity compensation module (520) compensates for disparities between images organized in the prediction structure (512) using global and local alignment techniques in the spatial domain. This enhances spatial correlation between images, which is subsequently exploited in frequency-domain redundancy reduction. The spatial-domain disparity compensation module (520) produces predictions (524) for blocks of the decoded images (382). The spatial-domain disparity compensation module (520) also outputs motion vector ("MV") data and/or global transform data (522), which parameterizes local and global disparity compensations, respectively.

Given the prediction structure (512), the image set $I_{set}$ can be organized as a pseudo video sequence. In some cases, disparities between images in an image set are too complicated to address with motion estimation and compensation. To address such disparities, the spatial-domain disparity compensation module (520) can apply a deformation transformation and/or a photometric transformation to one or more of the decoded images (382). The spatial-domain disparity compensation module (520) outputs parameter values for the global transformation(s) applied to a reference image. Alternatively, the spatial-domain disparity compensation module (520) determines and outputs parameter values for global transformation(s) applied to a section of a reference image, or to multiple reference images or sections thereof. The parameter values for the global transformation(s) can be determined and output for a current image or section thereof, indicating global transformation(s) to apply to a reference image before performing motion compensation for partitions of the current image or section thereof. Different images or sections within a current image can have different parameter values for global transformation(s).

In some example implementations, to determine motion-compensated predictions $C_{n,m}$ for a current image $I_m$, the spatial-domain disparity compensation module (520) can apply a deformation transformation (represented by the matrix $H_{n,m}$) and a photometric transformation (represented by the matrix $T_{n,m}$) to a reference image $I_n$, before performing motion estimation and compensation (represented by the function $F_{n,m}$) for partitions of the current image $I_m$ using the adjusted reference image:

$$C_{n,m} = F_{n,m}(T_{n,m} \times H_{n,m} \times I_n).$$

The deformation transformation matrix $H_{n,m}$ helps reduce geometric disparities between the reference image $I_n$ and current image $I_m$. In the example implementations, the spatial-domain disparity compensation module (520) determines the matrix $H_{n,m}$ from matched SIFT descriptors between images $I_n$ and $I_m$. For example, the transformation from one camera plane to another can be modeled as a homograph transform, which can be solved using three-dimensional matched coordinates. The transformation can be simplified to a two-dimensional affine transform and calculated by the RANSAC technique, as described in Fischler et al., "Random Sample Consensus: a Paradigm for Model Fitting with Applications to Image Analysis and Automated Cartography," Comm. of the ACM, vol. 24, pp. 381-395 (1981). For additional details, see Shi et al., "Feature-based Image Set Compression" or Shi et al., "Photo Album Compression for Cloud Storage Using Local Features," which are referenced above. Alternatively, the spatial-domain disparity compensation module (520) determines the matrix $H_{n,m}$ in some other way.

The photometric transformation matrix $T_{n,m}$ helps reduce illumination disparities between the reference image $I_n$ and current image $I_m$. In the example implementations, the spatial-domain disparity compensation module (520) determines the matrix $T_{n,m}$ from luma (brightness) sample values of the images $I_n$ and $I_m$. The matrix $T_{n,m}$ can be calculated by using all of the luma sample values of the images. Or, considering the robustness of the matched SIFT descriptors, the matrix $T_{n,m}$ can be calculated using only luma sample value for matched key-point locations. For additional details, see Shi et al., "Feature-based Image Set Compression" or Shi et al., "Photo Album Compression for Cloud Storage Using Local Features," which are referenced above. Alternatively, the spatial-domain disparity compensation module (520) determines the matrix $T_{n,m}$ in some other way.

Alternatively, the spatial-domain disparity module (520) skips the deformation transformation and photometric transformation. For example, the deformation transformation and photometric transformation can be skipped for a burst-mode capture series that lacks global disparities due to rotation, zooming, illumination changes, etc.

Following any adjustments using a deformation transformation and/or a photometric transformation, the spatial-domain disparity compensation module (520) can perform motion estimation and motion compensation $F_{n,m}$ to address any remaining, local disparities between a (transformed) reference image and image $I_m$. For motion estimation, a motion estimator estimates the motion of a partition of sample values of the current image with respect to a (transformed) reference image. The motion estimator produces as side information motion data such as MV data and reference image selection data for the partition. A motion compensator applies MVs to the (transformed) reference image(s) from the decoded picture buffer, producing motion-compensated predictions for blocks. Depending on implementation, various motion estimation techniques and motion compensation techniques used in conventional video encoders can be used by the spatial-domain disparity compensation module (520). A motion partition can have the same size as a block (transform block) used for transform and quantization of transform coefficients, or it can have a different size (e.g., motion partition larger than transform block).

Using the motion-compensated predictions $C_{n,m}$ for a current image $I_m$ and sample values for the current image $I_m$, one approach to compression is to calculate spatial-domain differences between sample values, then compress the spatial-domain differences (e.g., using a frequency transform, quantization and entropy coding). In this approach, lossy compression may reduce bitrate but usually prevents exact recovery of the previously compressed images. On the other hand, lossless compression of the spatial-domain differences, with or without a frequency transform, often increases storage cost for the compressed images, compared to the previously compressed images before re-encoding.

Instead of compressing spatial-domain differences, a third module (530) of the predictive image re-encoder (500) reduces frequency-domain redundancy between the disparity-compensated predictions and current image. The frequency-domain redundancy reduction module (530) computes quantized transform coefficients for a prediction (524). Then, the frequency-domain redundancy reduction module (530) determines frequency-domain differences between the quantized transform coefficients for the prediction (524) and corresponding quantized transform coefficients (362) provided by the base image decoder (410). Frequency-domain redundancy removal facilitates lossless compression of the first encoded data (402).

In some example implementations, the frequency-domain redundancy reduction module (530) determines frequency-domain differences and computes quantized transform coefficients for the predictions (524) on a block-by-block basis. The block size (transform block size) can be, for example, 8×8, 4×4, 16×16 or some other size.

The frequency-domain redundancy reduction module (530) uses frequency transformation and quantization processes that align with those of the base image encoder for the first encoded data (402). For a given prediction (524) (compensated image $C_{n,m}$), the frequency-domain redundancy reduction module (530) performs a frequency transform and quantizes the transform coefficients for the prediction (524). The quantization can use the same QP value that was used for the collocated block for the first encoded data (402). The quantization converts transform coefficients to lower resolution values (e.g., converting floating point values to integer values), and also reduces fluctuations in the differences. The frequency-domain redundancy reduction module (530) determines differences between the quantized transform coefficients for the prediction (524) and corresponding quantized transform coefficients (362) of the collocated block for the first encoded data (402).

In the example implementations, on a block-by-block basis, the frequency-domain redundancy reduction module (530) adaptively selects between using the frequency-domain differences for a block or the corresponding quantized transform coefficients of the collocated block for the first encoded data (402). For example, the frequency-domain redundancy reduction module (530) evaluates whether more bits are used for encoding that uses the frequency-domain differences or encoding that uses the corresponding quantized transform coefficients of the collocated block. For this decision, the frequency-domain redundancy reduction module (530) can consider actual encoding costs (using feedback from the entropy coder (340)) or estimated encoding costs. The frequency-domain redundancy reduction module (530) can consider the cost of signaling MV data for a partition associated with the block if frequency-domain differences are used. The frequency-domain redundancy reduction module (530) outputs mode decisions (534) for the blocks, indicating whether frequency-domain differences or corresponding quantized transform coefficients are used for the blocks, in addition to the frequency-domain differences or coefficients (532).

The entropy coder (340) receives the frequency-domain differences or coefficients (532) and entropy codes them, producing encoded data (349) for the frequency-domain differences or coefficients. The entropy coder (340) can operate as described with reference to the base image encoder of FIG. 3 (but possibly encode frequency-domain differences, not just quantized transform coefficients), or operate in some other way.

The multiplexer (550) receives the encoded data (349) for the frequency-domain differences or coefficients, the mode decisions (534), the MV data/global transform data (522) (including data indicating the matrices $M_{n,m}$ and/or $T_{n,m}$) and the prediction structure (512). The multiplexer (550) can entropy code any values that are not already entropy coded (e.g., MV data, global transform data, mode decisions). The multiplexer (550) combines the encoded data (349) with syntax elements for the mode decisions (534), MV data/global transform data (522) and prediction structure (512), producing the second encoded data (422) in a second format.

B. Example Image Re-Encoding Tools.

Figure 6:
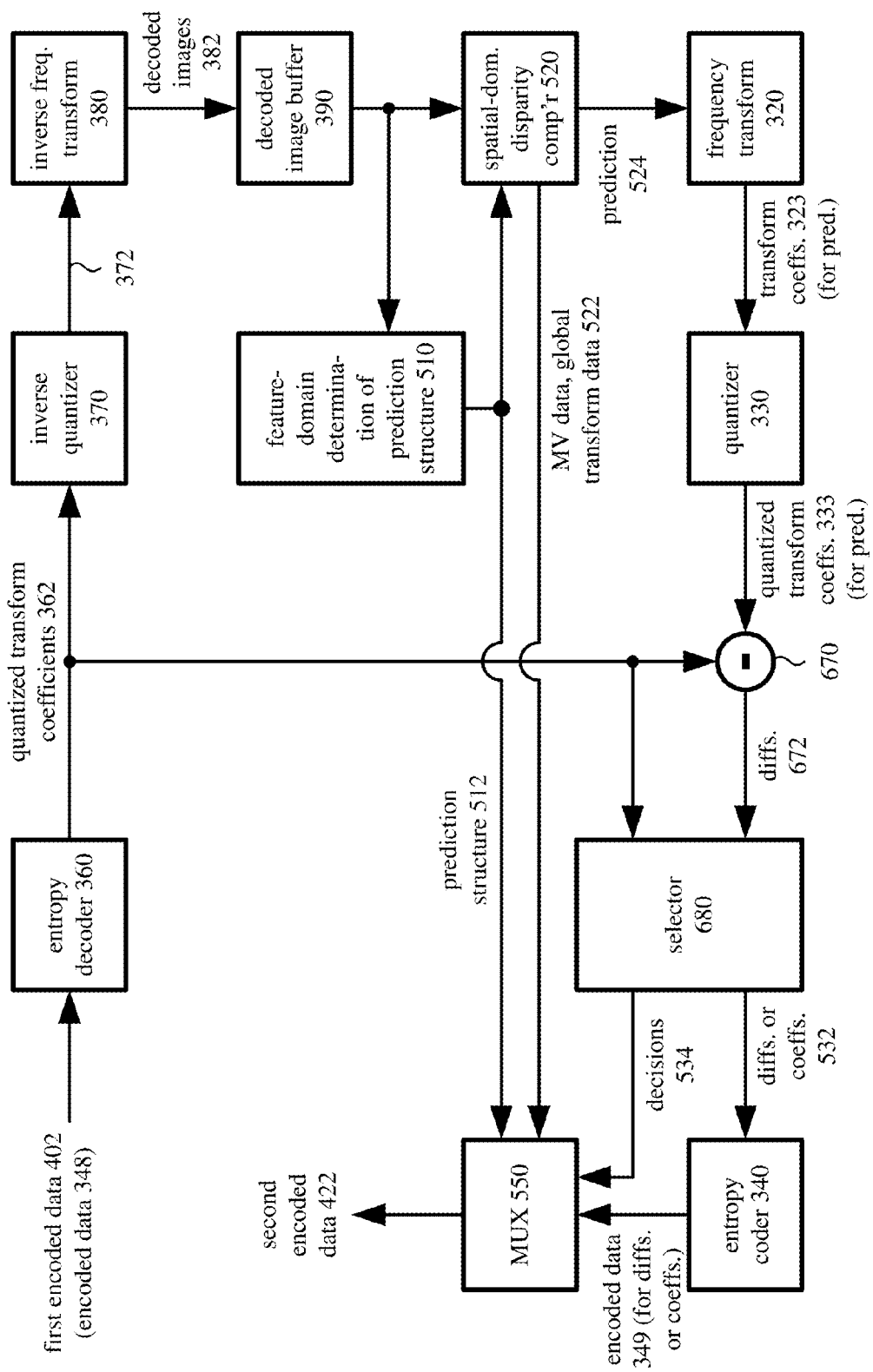
FIG. 6 is a diagram of an example image re-encoding tool in conjunction with which some described embodiments can be implemented.

FIG. 6 is a diagram of an example re-encoding tool (600) in conjunction with which some described embodiments can be implemented. The re-encoding tool (600) includes modules of a base decoder and modules of a predictive re-encoder. The base decoder, which is adapted to decode first encoded data (402) for images, includes an entropy decoder (360), inverse quantizer (370) and inverse frequency transformer (380), which operate as described with reference to FIG. 3. A decoded image buffer (390) stores a set of decoded images (382) reconstructed from the first encoded data (402).

The predictive re-encoder is adapted to re-encode at least one of the images (382) and produce second encoded data (422) for the set of decoded images (382). The predictive re-encoder includes a feature-domain determination module (510), as described with reference to FIG. 5, adapted to determine a prediction structure (512) for the images (382). The predictive re-encoder also includes a spatial-domain disparity compensation module (520), as described with reference to FIG. 5, adapted to determine a prediction (524) relative to one or more reference images and output MV data/global transform data (522).

For frequency-domain redundancy reduction, the predictive re-encoder includes a frequency transformer (320), quantizer (330) and differencing module (670). The frequency transformer (320) operates as described with reference to FIG. 3, but performs a frequency transform on the sample values of the prediction (524) instead of sample values of a block. The frequency transformer (320) produces transform coefficients (323) for the prediction. The frequency transformer (320) can use a frequency transform that is an inverse of the transform used by the inverse frequency transformer (380).

The quantizer (330) operates as described with reference to FIG. 3, but quantizes the transform coefficients (323) for the prediction and produces quantized transform coefficients (333) for the prediction. For a given block, the quantizer (330) and inverse quantizer (370) can use the same QP value (e.g., the QP value used for the block in the first encoded data (402)).

The differencing module (670) is adapted to compute frequency-domain differences (672) between the quantized transform coefficients (333) for the prediction and corresponding quantized transform coefficients (362) represented in the first encoded data (402). For example, the differencing module (670) computes the frequency-domain differences (672) on a block-by-block basis.

In FIG. 6, the predictive re-encoder also includes a selector module (680) adapted to select, for inclusion in the second encoded data (422), the frequency-domain differences (672) or the corresponding quantized transform coefficients (362). For example, the selector module (680) makes the selections on a block-by-block basis. The selections can depend at least in part on a cost metric for the differences (672) and a cost metric for the corresponding quantized transform coefficients (362). Alternatively, the selector module (680) considers other and/or additional criteria. The selector module (680) outputs decisions (534) for the selections as well as frequency-domain differences or coefficients (532), as described with reference to FIG. 5.

Finally, the predictive re-encoder also includes an entropy coder (340) and multiplexer (550), which operate as described with reference to FIG. 5.

C. Example Image Re-Encoding Techniques.

FIG. 7 is a flowchart of a generalized technique (700) for re-encoding images using frequency-domain differences. A re-encoding tool such as one described with reference to FIG. 4 or FIG. 6, or other re-encoding tool, can perform the technique (700).

To start, the re-encoding tool decodes (710) first encoded data for a set of multiple images in a first format. For example, the re-encoding tool performs entropy decoding, inverse quantization and an inverse frequency transform for a block. As part of the decoding (710), the re-encoding tool can perform other and/or additional decoding operations (e.g., for spatial prediction).

Then, the re-encoding tool re-encodes (720) at least one of the set of multiple images, producing second encoded data for the multiple images in a second format. For example, for a given block of one of the multiple images, the re-encoding tool performs the example technique (800) shown in FIG. 8 to re-encode the block using frequency-domain differences. Alternatively, the re-encoding tool performs other and/or additional operations to re-encode a block of one of the multiple images using frequency-domain differences.

With reference to FIG. 8, the re-encoding tool determines (810) a prediction relative to one or more reference images. For example, the re-encoding tool performs motion compensation or another form of spatial-domain disparity compensation for a partition associated with a given block of a current image relative to the reference image(s). The re-encoding tool can adjust one of the reference image(s) using one or more of a deformation transformation and a photometric transformation. The given image, reference image(s) and any other images of the multiple images can be organized according to a prediction structure. The prediction structure, which depends on analysis of features of the images, is used during spatial-domain disparity compensation to determine reference image relationships.

The re-encoding tool then computes (820) quantized coefficients for the prediction. For example, the re-encoding tool performs a frequency transform on the prediction to produce coefficients for the prediction. The re-encoding tool can quantize the coefficients for the prediction using the same QP value used for inverse quantization during the decoding (810).

The re-encoding tool computes (830) frequency-domain differences between the quantized coefficients for the prediction and corresponding quantized coefficients that are represented in the first encoded data. The re-encoding tool then entropy codes (840) the differences.

The re-encoding tool can repeat the determining (810) the prediction, the computing (820) the quantized coefficients, the computing (830) the frequency-domain differences and the entropy coding (840) on a block-by-block basis for multiple blocks of a current image of the multiple images. The re-encoding tool can select, for inclusion in the second encoded data for a block, the frequency-domain differences or the corresponding quantized coefficients according to criteria described above. For example, the re-encoding tool makes the selection depending at least in part on a cost metric for the frequency-domain differences and a cost metric for the corresponding quantized coefficients. Alternatively, the re-encoding tool considers other and/or additional criteria when selecting between the frequency-domain differences or the corresponding quantized coefficients.

V. Example Image Transcoding and Decoding Tools and Techniques.

An image transcoding tool or decoding tool reverses the re-encoding of the compressed images. From encoded data in the second format, the transcoding tool or decoding tool reconstructs frequency-domain differences between (a) quantized coefficients from encoded data in a first format and (b) quantized coefficients for a prediction. The transcoding tool or decoding tool combines the frequency-domain differences with the quantized coefficients for the prediction. After that, the results are entropy coded (for transcoding) or further reconstructed using inverse quantization, an inverse frequency transform, etc. (for decoding). In some example implementations, the previously compressed images in the first format can be exactly recovered from the encoded data in the second format.

A. Generalized Image Transcoding or Decoding Tools.

Figure 9:
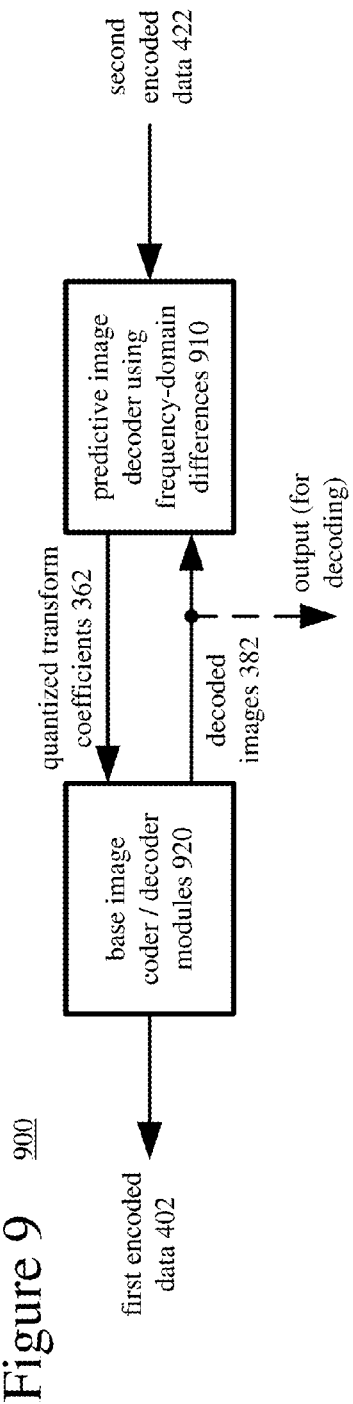
FIG. 9 is a diagram of a generalized image transcoding (or decoding) tool in conjunction with which some described embodiments can be implemented.

FIG. 9 is a diagram of a generalized image transcoding (or decoding) tool (900) in conjunction with which some described embodiments can be implemented. The image transcoding (or decoding) tool (900) includes modules (920) of a base image coder and/or base image decoder, as well as a predictive image decoder (910). The predictive image decoder (910) receives and at least partially decodes the second encoded data (422). As part of the decoding, for at least some blocks of the decoded images (382), the predictive image decoder (910) reconstructs frequency-domain differences from the second encoded data (422). The predictive image decoder (910) combines the frequency-domain differences and quantized transform coefficients for a prediction, producing quantized transform coefficients (362), which are provided to the modules (920) for the base image coder and/or decoder. The predictive image decoder (910) can be organized as described with reference to FIG. 10, or the predictive image decoder (910) can have some other organization (e.g., lacking spatial-domain disparity compensation).

Figure 10:
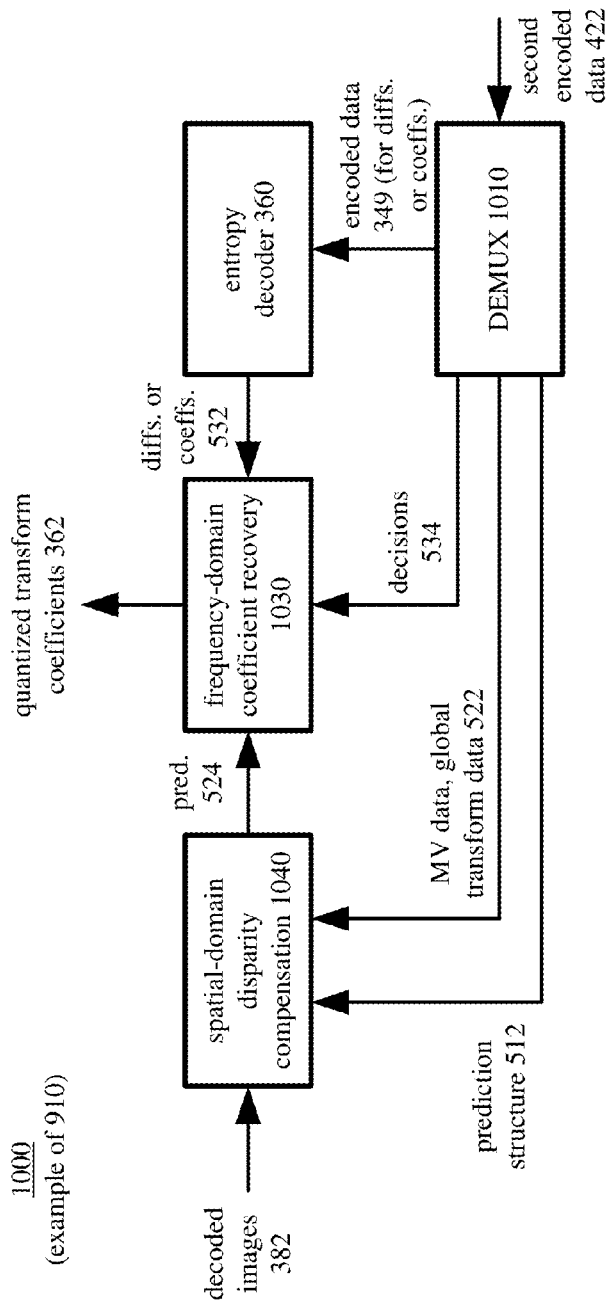
FIG. 10 is a diagram of an example predictive image decoder module in the image transcoding (or decoding) tool of FIG. 9.

FIG. 10 is a diagram of an example predictive image decoder (1000). The predictive image decoder (1000) uses a combination of spatial-domain and frequency-domain decompression techniques. Overall, the predictive image decoder (1000) determines spatial-domain predictions for at least some blocks of the decoded images (382) using signaled MV data, reconstructs frequency-domain differences, and combines the frequency-domain differences and quantized transform coefficients for the predictions.

In the predictive image decoder (1000), a demultiplexer (1010) receives the second encoded data (422), which includes encoded data (349) for frequency-domain differences or coefficients, mode decisions (534), MV data/global transform data (522) (including data indicating matrices $M_{n,m}$ and/or $T_{n,m}$) and a prediction structure (512). Aside from the encoded data (349) for frequency-domain differences or coefficients, the demultiplexer (1010) can entropy decode values that are entropy coded (e.g., MV data, global transform data, mode decisions). The demultiplexer (1010) provides the encoded data (349), mode decisions (534), MV data/global transform data (522) and prediction structure (512) to appropriate modules of the predictive images decoder (1000).

The entropy decoder (360) receives the encoded data (349) for the frequency-domain differences or coefficients, and entropy decodes the frequency-domain differences or coefficients (532). The entropy decoder (360) can operate as described with reference to the base image decoder of FIG. 3 (but possibly decode frequency-domain differences, not just quantized transform coefficients), or operate in some other way that mirrors the entropy coder (340) of the predictive image re-encoder (510).

A first module (1040) of the predictive image decoder (1000) performs spatial-domain disparity compensation. The spatial-domain disparity compensation module (1040) receives the MV data/global transform data (522) and prediction structure (512) from the demultiplexer (1010). The spatial-domain disparity compensation module (1040) compensates for disparities between images organized in the prediction structure (512) using global alignment (according to the global transform data) and local alignment (according to the MV data) in the spatial domain. The spatial-domain disparity compensation module (1040) produces predictions (524) for blocks of the decoded images (382).

In some example implementations, for disparity compensation using local alignments, the spatial-domain disparity compensation module (1040) can perform motion compensation to reduce disparity between a current image and one or more reference images. A decoded picture buffer buffers decoded images (382) that can be used as reference images. A motion compensator applies MVs to the reference image(s) from the decoded picture buffer, producing motion-compensated predictions. Depending on implementation, various motion compensation techniques used in conventional video decoders can be used by the spatial-domain disparity compensation module (1040). A motion partition used for motion compensation can have the same size as a transform block, or it can have a different size.

For disparities that are too complicated to address with motion compensation, the spatial-domain disparity compensation module (1040) can apply a deformation transformation and/or a photometric transformation to a reference image. Examples of a matrix $H_{n,m}$ (indicating parameters for a deformation transformation) and a matrix $T_{n,m}$ (indicating parameters for a photometric transformation) are described above. For example, to determine motion-compensated predictions $C_{n,m}$ for a current image $I_m$, the spatial-domain disparity compensation module (1040) applies a deformation transformation (represented by the matrix $H_{n,m}$) and a photometric transformation (represented by the matrix $T_{n,m}$) to a reference image $I_n$, before performing motion compensation (represented by the function $F_{n,m}$) using the adjusted reference image:

$$C_{n,m}=F_{n,m}(T_{n,m}\times H_{n,m}\times I_n).$$

Alternatively, the spatial-domain disparity module (1040) skips the deformation transformation and photometric transformation.

A second module (1030) of the predictive image decoder (1000) performs frequency-domain coefficient recovery. The frequency-domain coefficient recovery module (1030) computes quantized transform coefficients for a prediction (524). The frequency-domain coefficient recovery module (1030) also reconstructs frequency-domain differences between the quantized transform coefficients for the prediction (524) and corresponding quantized transform coefficients. The frequency-domain coefficient recovery module (1030) combines the reconstructed differences and the quantized transform coefficients for the prediction (524), producing quantized transform coefficients (362).

In some example implementations, the frequency-domain coefficient recovery module (1030) reconstructs frequency-domain differences and computes quantized transform coefficients for the prediction (524) on a block-by-block basis. The block size can be, for example, 8×8, 4×4, 16×16 or some other size.

The frequency-domain coefficient recovery module (1030) uses frequency transformation and quantization processes that align with those of the base image encoder for the first encoded data (402). For a given prediction (524) (compensated image $C_{n,m}$), the frequency-domain coefficient recovery module (1030) performs a frequency transform and quantizes the transform coefficients for the prediction (524). The quantization can use the same QP value that was used for the collocated block for the first encoded data (402). In a separate path, the frequency-domain coefficient recovery module (1030) reconstructs frequency-domain differences (received from the entropy decoder (360)) and combines them with the quantized transform coefficients for the prediction (524), to reconstruct corresponding quantized transform coefficients (362) of the collocated block for the first encoded data (402).

In the example implementations, the frequency-domain coefficient recovery module (1030) receives mode decisions (534) for blocks, indicating whether frequency-domain differences or corresponding quantized transform coefficients (532) were used for the respective blocks during encoding. On a block-by-block basis, the frequency-domain coefficient recovery module (1030) selects between frequency-domain differences for a block (in which case the differences are combined with quantized transform coefficients for a prediction for the block) or corresponding quantized transform coefficients of the collocated block. Thus, the predictive image decoder (1000) can reconstruct an inter-coded block using frequency-domain differences for the block, or it can reconstruct an intra-coded block using the corresponding quantized transform coefficients for the block.

Returning to FIG. 9, the modules (920) of a base image coder and/or base image decoder receive the quantized transform coefficients (362). For transcoding, the modules (920) include an entropy coder that entropy codes the quantized transform coefficients (362). The entropy coder can be an entropy coder (340) as described with reference to FIG. 3 or another entropy coder. The entropy coder outputs first encoded data (402) for a set of compressed images, e.g., for a photograph album or burst-mode capture series. Thus, the predictive image decoder (910) can facilitate recovery of the previously compressed images in the first format.

For transcoding or decoding, the modules (920) include an inverse quantizer and inverse frequency transformer. The inverse quantizer can be an inverse quantizer (370) as described with reference to FIG. 3 or other inverse quantizer. The inverse frequency transformer can be an inverse frequency transformer (380) as described with reference to FIG. 3 or other inverse frequency transformer. In any case, the modules (920) are used to reconstruct the decoded images (382) from the quantized transform coefficients (362).

At least some images (382) can be transcoded or decoded without using the spatial-domain disparity compensation module (1040) and frequency-domain coefficient recovery module (1030) of the predictive image decoder (910). For example, an intra-coded image can be transcoded or decoded as an individual image using only modules (920) of the base image encoder and/or base image decoder.

B. Example Image Transcoding or Decoding Tools.

Figure 11:
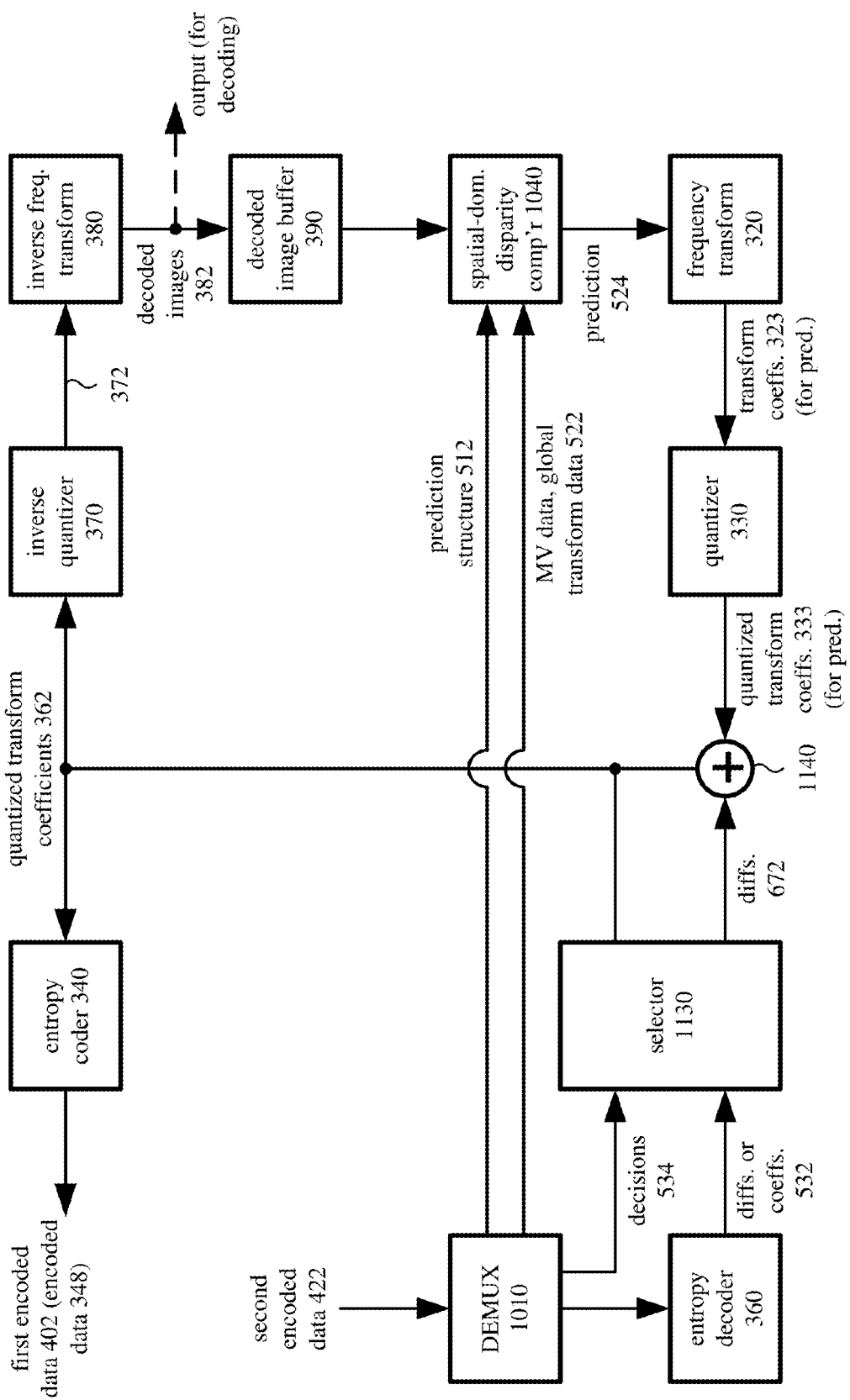
FIG. 11 is a diagram of an example image transcoding (or decoding) tool in conjunction with which some described embodiments can be implemented.

FIG. 11 is a diagram of an example transcoding (or decoding) tool (1100) in conjunction with which some described embodiments can be implemented. The transcoding (or decoding) tool (1100) includes modules of a base encoder and base decoder, as well as modules of a predictive decoder. The predictive decoder includes a spatial-domain disparity compensation module (1040), as described with reference to FIG. 10, adapted to use MV data/global transform data (522) and a prediction structure (512) to determine a prediction (524) relative to one or more reference images of the decoded images (382).

For frequency-domain coefficient recovery, the predictive decoder includes a frequency transformer (320), quantizer (330) and combining module (1140). The frequency transformer (320) operates as described with reference to FIG. 3, but performs a frequency transform on the sample values of the prediction (524) instead of sample values of a block. The frequency transformer (320) produces transform coefficients (323) for the prediction. The frequency transformer (320) can use a frequency transform that is an inverse of the transform used by the inverse frequency transformer (380).

The quantizer (330) operates as described with reference to FIG. 3, but quantizes the transform coefficients (323) for the prediction and produces quantized transform coefficients (333) for the prediction. For a given block, the quantizer (330) and inverse quantizer (370) can use the same QP value (e.g., the QP value used for the block in the first encoded data (402)).

The predictive decoder also includes an entropy decoder (360) and demultiplexer (1010), which operate as described with reference to FIG. 10.

The combining module (1140) is adapted to combine frequency-domain differences (672) and the quantized transform coefficients (333) for the prediction to reconstruct corresponding quantized transform coefficients (362). For example, the combining module (1140) combines the frequency-domain differences (672) and quantized transform coefficients (333) on a block-by-block basis.

In FIG. 11, the predictive decoder also includes a selector module (1130) adapted to determine, based on mode decisions (534) from the second encoded data (422), whether frequency-domain differences or corresponding quantized transform coefficients were used for the respective blocks during encoding. On a block-by-block basis, the selector module (1130) selects between frequency-domain differences (672) for a block (in which case the differences (672) are combined with quantized transform coefficients (333) for a prediction for the block) or corresponding quantized transform coefficients of the collocated block. Either way, the predictive decoder produces quantized transform coefficients (362) for the block.

For transcoding, the modules of the base encoder include an entropy coder (340), which operates as described with reference to FIG. 3 to entropy code quantized transform coefficients (362) and produce first encoded data (402).

For transcoding or decoding, the modules of the base decoder include an inverse quantizer (370) and inverse frequency transformer (380), which operate as described with reference to FIG. 3 to reconstruct the decoded images (382) from the quantized transform coefficients (362). The decoded image buffer (390) stores the set of decoded images (382) reconstructed from the first encoded data (402).

C. Example Transcoding/Decoding Techniques.

FIG. 12 is a flowchart of a generalized technique (1200) for transcoding (or decoding) images using frequency-domain differences. A transcoding tool or decoding tool such as one described with reference to FIG. 9 or FIG. 11, or other transcoding or decoding tool, can perform the technique (1100).

To start, the transcoding tool or decoding tool receives (1210) encoded data for a set of multiple images in a second format, where at least some of the multiple images were encoded using frequency-domain differences. The transcoding tool or decoding tool processes (1220) the encoded data in the second format. For example, for a given block of one of the multiple images, the transcoding tool or decoding tool performs the example technique (1300) shown in FIG. 13 to process the block using frequency-domain differences. Alternatively, the transcoding tool or decoding tool performs other and/or additional operations when processing (1220) a block of one of the multiple images.

With reference to FIG. 13, the transcoding tool or decoding tool computes (1310) a prediction relative to one or more reference images. For example, using MV data, the transcoding tool or decoding tool performs motion compensation or another form of spatial-domain disparity compensation for a given partition of a current image relative to the reference image(s). Using global transform data, the transcoding tool or decoding tool can adjust one of the reference image(s) using one or more of a deformation transformation and a photometric transformation. The given image, reference image(s) and any other images of the multiple images can be organized according to a prediction structure, in which case the spatial-domain disparity compensation can use the prediction structure to determine reference image relationships.

The transcoding tool or decoding tool then computes (1320) quantized coefficients for the prediction. For example, the transcoding tool or decoding tool performs a frequency transform on the prediction to produce coefficients for the prediction, then quantizes the coefficients for the prediction.

The transcoding tool or decoding tool entropy decodes (1330) frequency-domain differences, then combines (1340) combines the frequency-domain differences and the quantized coefficients for the prediction to reconstruct corresponding quantized coefficients.

For decoding, a decoding tool inverse quantizes the corresponding quantized coefficients and performs an inverse frequency transform on the inverse quantized coefficients. For transcoding, a transcoding tool entropy codes the corresponding quantized coefficients.

The transcoding tool or decoding tool can repeat the computing (1310) the prediction, the computing (1320) the quantized coefficients, the entropy decoding (1330) the frequency-domain differences and the combining (1340) on a block-by-block basis for multiple blocks of a current image of the multiple images. Based on decision mode information, the transcoding tool or decoding tool can determine whether encoded data for a block represents frequency-domain differences or corresponding quantized coefficients.

VI. Alternatives and Variations.

The examples described herein include codec systems, image re-encoding tools and image transcoding (or decoding) tools. Any of the systems or tools described herein can be implemented in software as an operating system module, as part of an application library or as a standalone application. Or, any of the systems or tools can be implemented (in whole or in part) in hardware as a part of a system-on-a-chip ("SoC"), ASIC or FPGA, or using a GPU or other special-purpose hardware for hardware-accelerated operations. Also, depending on implementation, modules of any of the systems or tools can be added, omitted, split into multiple modules, combined with other modules, and/or replaced with like modules. The relationships shown between modules within the system or tool indicate general flows of information; other relationships are not shown for the sake of simplicity.

Image re-encoding using frequency-domain differences can be used for lossless compression and decompression, as described herein. Image re-encoding using frequency-domain differences can also be used for lossy compression and decompression (e.g., using higher QP values for frequency-domain differences or quantized transform coefficients in the second format, compared to corresponding quantized transform coefficients in the first format).

In many of the examples described herein, a re-encoding tool or transcoding (or decoding) tool uses a block-based frequency transform and/or block-based inverse frequency transform. Alternatively, a re-encoding tool or transcoding (or decoding) tool uses a wavelet-based approach, computing coefficients for a prediction of a block (portion) of an image using wavelets, and computing (or reconstructing) differences between quantized wavelet coefficients for the prediction and corresponding quantized wavelet coefficients for the block (portion). In this case, the frequency-domain differences are wavelet-domain differences.

Image re-encoding using frequency-domain differences can include spatial-domain disparity compensation in order to align blocks with their corresponding predictions in reference images, as described herein. Alternatively, if images are already highly correlated (e.g., images in a burst-mode capture series), the prediction for a block of a current image can simply be the collocated block in a reference image, without any spatial-domain disparity compensation. In such implementations, the encoded data in the second format typically consumes less overhead because it lacks MV data.

In some of the examples described herein, a re-encoding tool or transcoding (or decoding) tool uses motion compensation to determine a prediction for a fixed-size partition. Alternatively, the re-encoding tool or transcoding (or decoding) tool uses another form of motion compensation (e.g., employing merge mode or another MV competition scheme, employing MV prediction, employing variable-size motion partitions).

In some of the examples described herein, a re-encoding tool or transcoding (or decoding) tool uses Huffman coding/decoding or another type of variable length coding/decoding to entropy code/decode frequency-domain differences and side information (e.g., MV data, global transform data, prediction structure). Alternatively, the re-encoding tool or transcoding (or decoding) tool uses another type of entropy coding/decoding such as binary adaptive arithmetic coding/decoding.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing system, a method comprising:
   decoding first encoded data for a set of multiple images; and
   re-encoding at least one image of the set of multiple images and producing second encoded data for the set of multiple images, including:
      determining a prediction relative to one or more reference images;
      computing quantized coefficients for the prediction;
      computing frequency-domain differences between the quantized coefficients for the prediction and corresponding quantized coefficients that are represented in the first encoded data; and
      entropy coding the frequency-domain differences.

2. The method of claim 1 wherein the computing the quantized coefficients for the prediction includes performing a frequency transform on sample values of the prediction to produce coefficients for the prediction, and wherein an inverse frequency transform performed during the decoding is an inverse of the frequency transform.

3. The method of claim 2 wherein the decoding further comprises inverse quantization that uses a quantization parameter value, and wherein the computing the quantized coefficients for the prediction further includes quantizing the coefficients for the prediction using the quantization parameter value.

4. The method of claim 1 wherein the re-encoding further comprises:
   selecting, for inclusion in the second encoded data, the frequency-domain differences or the corresponding quantized coefficients.

5. The method of claim 4 wherein the selecting depends at least in part on a cost metric for the frequency-domain differences and a cost metric for the corresponding quantized coefficients.

6. The method of claim 1 wherein the determining the prediction, the computing the quantized coefficients, the computing the frequency-domain differences and the entropy coding are repeated on a block-by-block basis for multiple blocks of a given image of the multiple images, and wherein the determining the prediction includes performing spatial-domain disparity compensation for the prediction for a given block of the multiple blocks relative to the one or more reference images.

7. The method of claim 6 wherein the one of the one or more reference images is adjusted using one or more of a deformation transformation and a photometric transformation.

8. The method of claim 6 wherein the multiple images are organized according to a prediction structure that depends on analysis of features of the multiple images, and wherein the spatial-domain disparity compensation uses the prediction structure.

9. The method of claim 1 further comprising:
decoding the second encoded data for the multiple images, including:
  computing the prediction;
  computing the quantized coefficients for the prediction;
  entropy decoding the frequency-domain differences;
  combining the frequency-domain differences and the quantized coefficients for the prediction to reconstruct the corresponding quantized coefficients;
  inverse quantizing the corresponding quantized coefficients; and
  performing an inverse frequency transform on the inverse quantized coefficients.

10. The method of claim 1 further comprising:
transcoding the second encoded data into the first encoded data, including:
  computing the prediction;
  computing the quantized coefficients for the prediction;
  entropy decoding the frequency-domain differences;
  combining the frequency-domain differences and the quantized coefficients for the prediction to reconstruct the corresponding quantized coefficients; and
  entropy coding the corresponding quantized coefficients.

11. A computing system comprising:
a base image decoder adapted to decode first encoded data for a set of images; and
a predictive re-encoder adapted to re-encode at least one image of the set of images and produce second encoded data for the set of images, the predictive re-encoder including:
  a spatial-domain disparity compensation module adapted to determine a prediction relative to one or more reference images;
  a frequency transformer adapted to produce transform coefficients for the prediction;
  a quantizer adapted to quantize the transform coefficients for the prediction;
  a differencing module adapted to compute frequency-domain differences between the quantized transform coefficients for the prediction and corresponding quantized transform coefficients represented in the first encoded data; and
  an entropy coder adapted to entropy code the frequency-domain differences.

12. The computing system of claim 11 wherein the frequency transformer uses a frequency transform, and wherein the base image decoder includes an inverse frequency transformer that uses an inverse frequency transform that is an inverse of the frequency transform.

13. The computing system of claim 11 wherein the base image decoder includes an inverse quantizer that uses a quantization parameter value, and wherein the quantizer uses the quantization parameter value.

14. The computing system of claim 11 wherein the predictive re-encoder further comprises:
a selector module adapted to select, for inclusion in the second encoded data, the frequency-domain differences or the corresponding quantized transform coefficients.

15. The computing system of claim 14 wherein the selecting depends at least in part on a cost metric for the frequency-domain differences and a cost metric for the corresponding quantized transform coefficients.

16. The computing system of claim 11 further comprising:
a second decoder adapted to decode the second encoded data, including:
  a spatial-domain disparity compensation module adapted to compute the prediction;
  a frequency transformer adapted to produce the transform coefficients for the prediction;
  a quantizer adapted to quantize the transform coefficients for the prediction;
  an entropy decoder adapted to entropy decode the frequency-domain differences;
  a combining module adapted to combine the frequency-domain differences and the quantized transform coefficients for the prediction to reconstruct the corresponding quantized transform coefficients;
  an inverse quantizer adapted to inverse quantize the corresponding quantized transform coefficients; and
  an inverse frequency transformer adapted to perform an inverse frequency transform on the inverse quantized transform coefficients.

17. The computing system of claim 11 further comprising:
a transcoder adapted to reconstruct the first encoded data from the second encoded data, including:
  a spatial-domain disparity compensation module adapted to compute the prediction;
  a frequency transformer adapted to produce the transform coefficients for the prediction;
  a quantizer adapted to quantize the transform coefficients for the prediction;
  an entropy decoder adapted to entropy decode the frequency-domain differences;
  a combining module adapted to combine the frequency-domain differences and the quantized transform coefficients for the prediction to reconstruct the corresponding quantized transform coefficients; and
  an entropy coder adapted to entropy code the corresponding quantized transform coefficients.

18. One or more computer-readable memory devices storing computer-executable instructions for causing a computing system programmed thereby to perform operations comprising:
receiving encoded data for a set of multiple images; and
processing the encoded data for the set of multiple images, including:
  computing a prediction relative to one or more reference images;
  computing quantized coefficients for the prediction;
  entropy decoding frequency-domain differences between the quantized coefficients for the prediction and corresponding quantized coefficients;
  combining the frequency-domain differences and the quantized coefficients for the prediction to reconstruct the corresponding quantized coefficients.

19. The one or more computer-readable memory devices of claim 18 wherein the processing is part of decoding, and wherein the decoding further includes:

inverse quantizing the corresponding quantized coefficients; and performing an inverse frequency transform on the inverse quantized coefficients.

20. The one or more computer-readable memory devices of claim 18 wherein the processing is part of transcoding, and wherein the transcoding further includes:

entropy coding the corresponding quantized coefficients.

\* \* \* \* \*